United States Patent
Brebant et al.

[15] 3,667,452
[45] June 6, 1972

[54] CONTAINER FOR THE PRESERVATION AND CONSUMPTION OF DIFFERENT COOKED FOODS

[72] Inventors: Robert Brebant, 8 bis place Charles Digeon, 94 Saint-Mande; Maurice P. Tamboise, 78 Crespieres, both of France

[22] Filed: Mar. 30, 1970

[21] Appl. No.: 23,762

[30] Foreign Application Priority Data

Mar. 31, 1969 France..................................6909706

[52] U.S. Cl..............................................................126/390
[51] Int. Cl................................................................F47j 27/00
[58] Field of Search..........................................126/390, 376

[56] References Cited

UNITED STATES PATENTS

| | | | |
|---|---|---|---|
| 1,627,650 | 5/1927 | Katzinger..............................126/376 |
| 2,581,161 | 1/1952 | Anderson..............................126/390 |
| 3,040,735 | 6/1962 | Lyon, Jr.................................126/376 |
| 3,079,912 | 3/1963 | Griem....................................126/390 |

FOREIGN PATENTS OR APPLICATIONS 255,844 3/1927 Great Britain..........................126/376

*Primary Examiner*—Frederick L. Matteson
*Assistant Examiner*—Theophil W. Streule
*Attorney*—McDougall, Hersh & Scott

[57] ABSTRACT

A sheet metal container for the packaging and service of various food products to be heated to different temperatures in which the sheet metal container is formed with separated compartments having bottom walls at different levels, depending upon the amount of heat required to be generated in the compartment, and having outer walls with surfaces having different reflective characteristics, depending upon the amount of heat desired to be generated within the compartments, and in which the compartments are separated one from another with slotted portions in between to minimize heat transfer by conduction and which includes a lid having corresponding differences in heat reflection of the surfaces and with slotted portions therein corresponding to the slotted arrangement in the container.

5 Claims, 3 Drawing Figures

PATENTED JUN 6 1972  3,667,452
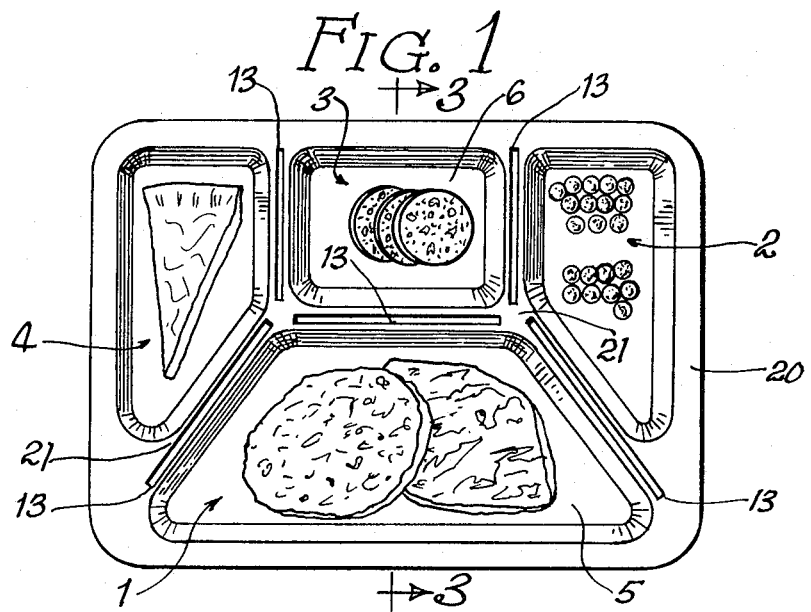
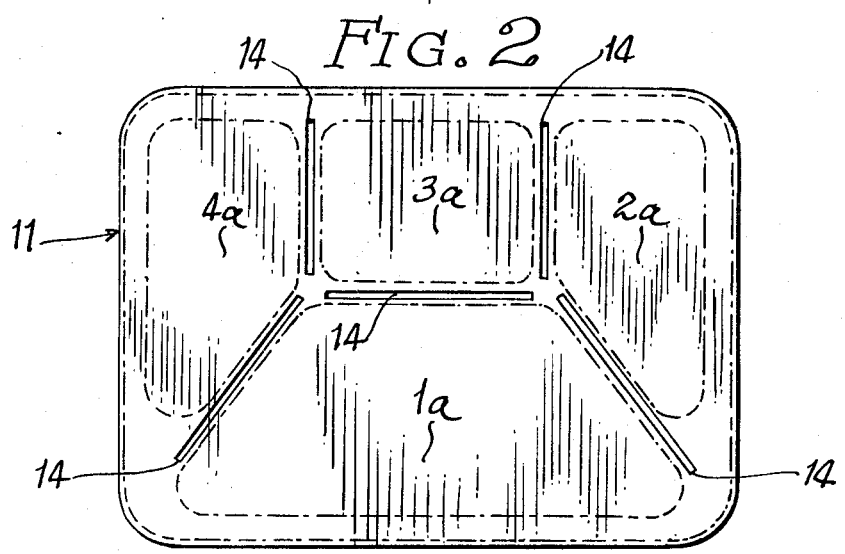
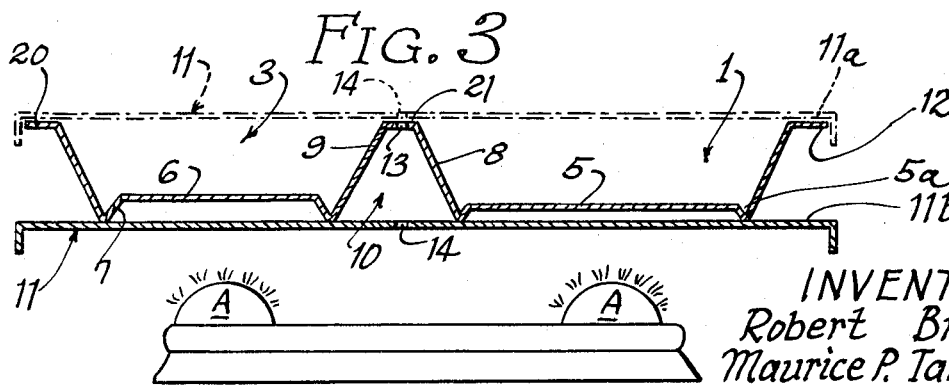
INVENTORS
Robert Brebant
Maurice P. Tamboise
by McDougall, Hersh and Scott
Att'ys

CONTAINER FOR THE PRESERVATION AND CONSUMPTION OF DIFFERENT COOKED FOODS

This invention relates to containers for the preservation of various cooked foods packaged in the container in a frozen or refrigerated state and in which the container assembly can be heated to render the content material consumable, with different portions heated to different temperatures, depending somewhat upon the nature of the particular food product.

Containers have been stamped of sheet metal with separate compartments for different food dishes and with a sheet metal cover for enclosing the same and in which the walls of the compartments differ in color for purposes of differentiation in the amount of heat absorbed in the particular compartments for variation in the temperature to which the compartment is raised.

However, it is an object of this invention to provide a container of the type described, having a plurality of compartments for the storage of frozen or refrigerated foods, and in which means are provided for variation in the amount of heat absorbed by the various compartments to enable the service of the consumable food products at the desired temperature, and in which heat transfer from one compartment to another is minimized so as to be able to maintain the desired temperature differential.

These and other objects and advantages of this invention will hereinafter appear, and for purposes of illustration, but not of limitation, an embodiment of the invention is illustrated in the accompanying drawing in which FIG. 1 is a top plan view of a container embodying the features of this invention, with each compartment illustrated as containing a different food product;

FIG. 2 is a top plan view of a cover adapted to be used with the container of FIG. 1; and FIG. 3 is a sectional view taken along the line 3—3 of FIG. 1 with the cover located beneath the container.

In the illustrated modification, the container is formed by molding of a thin sheet of reflective metal, such as aluminum, steel or the like, to form compartments in the form of pockets 1, 2, 3 and 4, surrounded by a raised, horizontally disposed, flat rim section 20, and in which the compartments are separated one from the other by intermediate, horizontally disposed land sections 21 at about the same level as the rim sections 20. It will be understood that the pocketed sections of compartments may be more or less in number, or of different shapes from the standpoint of depth or contour.

For purposes of illustration, each of the pockets is filled with a different food product, such as adapted to make up a full meal, and in which the different food products are adapted to be provided at different temperatures for consumption. For example, compartment 1 contains a cooked meat product, compartment 2 a vegetable, compartment 3 an appetizer, and compartment 4 a dessert. In use, the prepared foods are cooled, preferably to freezing temperature, for preservation, during storage or distribution, and the cooled food products are later adapted to be heated for consumption.

The container can be fabricated, by way of example, by sheet metal stamping, as from an aluminum sheet. The depths of the various compartments are varied depending somewhat upon the temperature to which the food product contained therein is to be heated. For example, it is desirable immediately to heat the meat and vegetable in compartments 1 and 2 to high temperature, while the appetizer and dessert in compartments 3 and 4 remain cool for consumption.

This result can be achieved, in accordance with the practice of this invention, by variation in the depth of the compartments in a manner to vary the spaced relationship between the bottom walls of the respective compartments and the level of the edge upon which the container rests. For example, in compartments 1 and 2, containing the meat product and vegetable, the bottom walls 5 extend downwardly to the vicinity of the lowest part of the container and are advantageously formed with a wadding 5a at the edge. On the other hand, in compartments 3 and 4, which are to acquire less heat, the bottom wall 6 is located considerably above the bottom wall 5 of the compartments 1 and 2, and the bottom 6 is formed with a stamped rib 7 having thin edges.

The adjacent side walls of the compartments, such as the walls 8 of compartment 1 and the walls 9 of compartment 3, have considerable stripping and are adapted to define a spaced relationship therebetween, in the form of aisles 10, which are as wide as possible in order to limit the transmission of heat from one compartment to another by conduction.

As illustrated in FIG. 3, the outer walls of the compartments containing food products requiring the most heat are provided with a surface or color that will enhance the absorption of heat, such as a black or dark paint or a non-reflective surface. The outer walls of the compartments, in which less heating is desired, such as in compartments 3 and 4, are left bare to provide a surface that will tend to reflect heat.

The container is adapted to be closed with a lid 11 formed of sheet metal and having a shape conforming to that of the container with the edges 11a adapted to be glued, rolled, crimped, or otherwise fastened to the peripheral edge 12 of the container to enclose the package food products therein.

As in the container, the portions of the cover overlying the compartments to be heated, such as portions 2a overlying compartment 2, are formed with a surface that will preferentially absorb heat, while the remainder is left bare or with a light color such as at 3a and 4a, to reflect heat.

Further to minimize heat transfer between compartments, slots 13 are provided in the lands between the adjacent compartments. The slots are dimensioned to be as long as possible, consistent with the ability to maintain the desired mechanical strength or integrity of the container. It is advantageous, though not essential, for the cover 11 to be formed with similar slots 14, preferably arranged to coincide with the slots 13 of the container, when the cover is in position of use.

The food products can be packaged in the container, sealed by the cover, and refrigerated to a frozen state for storage, shipment, sale and use. When it is desired to consume the food products housed within a container, the container is exposed to heat generated by one or more means. To be specific, the covered container can be heated in an infrared oven or a microwave oven whereby the radiations will be absorbed by the dark or non-reflective surfaces thereby preferentially to heat the respective compartments. The slots 13 and 14 will operate to minimize heat transfer by conduction from one compartment to another.

The containers can be heated on an electric plate because heat transfer is substantially by radiation and partially by conduction. By reason of the different levels of the bottom walls 5 and 6, the amount of heat acquired by one differs considerably from the amount of heat acquired by the other so that the compartments with the greater depth will be heated to higher temperatures than the compartments in which the bottom walls are spaced a greater distance from the heating element.

With gas burners A, as illustrated in FIG. 3, it is desirable first to detach the cover 11 and to place the cover adjacent the bottom side of the container with the absorbent surfaces underlying the compartments adapted to be heated to the higher temperatures. Thus the cover 11 forms a partition 11b which is directly heated by the gas burners A and which then radiate the heat towards the bottom side of the container compartments. The amount of heat radiated will be greater from the heat absorbent portions than from the remainder. Slots 13 in the container will permit the upward escape of hot air thereby to limit the heating of the compartments 3 and 4 in which it is desired to serve a cold food product.

In order to illustrate the invention, several examples of the results obtained are given below:

EXAMPLE 1

In a compartmentized container of the above type, but not having the slots (13) between the compartments, there were placed:

in compartment 1 - a dish constituted by a vegetable: string beans
in compartment 3 - a dish constituted by tuna fish with mayonnaise
in compartment 4 - a dish constituted by pineapple in juice Compartment 1 was painted black. Compartments 3 and 4 were left in their natural condition.

The dishes had been deep frozen and then preserved at −18° C.

After 20 minutes heating from −18° C. (about 0° F.) at the electric infrared grill, the following temperatures are obtained:

| | | |
|---|---|---|
| in compartment 1 - | vegetable | 67° C |
| in compartment 3 - | tuna | 19° C |
| | mayonnaise | from 20° to 40° C (on walls) |
| in compartment 4 - | pineapple slices | 13° C |
| | juice | 25° C |

EXAMPLE 2

Using a container according to the invention, that is with slots (13) between compartments, the following temperatures are obtained:

| | | |
|---|---|---|
| in compartment 1 - | vegetable | 50° to 65° C |
| in compartment 3 - | tuna-mayonnaise | 0 to 5° C |
| in compartment 4 - | pineapple chunks | 0 to 4° C |
| | juice | 2° C |

EXAMPLE 3

The same procedure is used as in Example 2 but in compartment 1 the vegetable is replaced by meat in gravy. Then the following temperatures are obtained:

| | | |
|---|---|---|
| in compartment 1 - | meat | 45° C |
| | gravy | 72° C |
| in compartment 3 - | tuna | 7° C |
| | mayonnaise | 2° C |
| in compartment 4 - | pineapple chunks | 4° C |
| | juice | 5° C |

In the foregoing examples, temperature measurements are not given for the compartment 2 since the latter is of similar shape and dimension as compartment 4.

It will be understood that changes may be made in the details of construction, arrangement and operation without departing from the spirit of the invention. Such changes may relate, for example, to the shape and arrangement of the compartments and their depths and to the distribution and shape of the slots.

We claim:

1. A container for the preservation and consumption of different foods to be heated to different temperatures comprising a unitary sheet metal member subdivided into a plurality of separated compartments by side walls which extend upwardly from bottom walls to horizontally disposed lands, with the compartments being arranged so that at least two of the side walls of each compartment extend alongside the side walls of adjacent compartments with the land common to the side walls of adjacent compartments, means for differential heating of the compartments in which the bottom walls of the compartment adapted to be heated to higher temperatures are at a lower level than the bottom walls of others of the compartments and/or in which the compartments to be heated to higher temperature have outer walls the surfaces of which are more heat absorbent than the others, which includes means for reducing the conductive heat transfer between adjacent compartments comprising elongate slots in the land portions between adjacent compartments in which the lengths of the slots are parallel to the adjacent walls of the compartments, and a lid for covering the container.

2. A container as claimed in claim 1 in which the surfaces of the compartments adapted to be heated to the higher temperatures are in the form of dark surfaces.

3. A container as claimed in claim 1 in which the surfaces of the compartments adapted to be heated to the higher temperatures are in the form of non-reflective surfaces.

4. A container as claimed in claim 1 in which the lid is formed with slots in portions coinciding with the slots in the container when the cover is in position of use on the container.

5. A container as claimed in claim 1 in which the lid is formed with non-reflective surfaces in the portions covering the compartments having surfaces of high heat absorption.

* * * * *